WILLIAM A. CLEVELAND, OF WATERVILLE, NEW YORK.

Letters Patent No. 88,134, dated March 23, 1869.

IMPROVED MEDICINE FOR CURE OF RING-BONE, SPAVIN, &c.

The Schedule referred to in these Letters Patent and making part of the same.

*To all whom it may concern:*

Be it known that I, WILLIAM A. CLEVELAND, of Waterville, in the county of Oneida, and State of New York, have invented a new and useful Compound Medicine for the Cure of Ring-Bone, Spavin, Splint, and other osseous diseases and injuries of the limbs of horses and other animals; and I do hereby declare that the following is a full and exact description thereof, and of the manner of compounding and applying the same.

I make a bath as follows:

I take one pint of alcohol, and mix it with one and a half ounce of resublimate of iodine. I then add three-fourths of an ounce of bichloride of mercury, and let this mixture stand five hours. I then add to it one-fourth of an ounce of croton-oil, half an ounce of oil of cloves, and one-fourth ounce of iodide of sulphur, and let this mixture stand ten hours. I then add one ounce of balsam-copaiva, and, shaking the whole well together, it is ready for use. It is to be bottled up, and closed with a ground stopper. This mixture I have named "Bony."

I then, with the aid of the above mixture, which I term "bony," make the following compound medicine, for external application to the diseased limb, and for the purpose of removing the disease. Having omitted, in the mixture termed "bony," some active ingredients used in the compound heretofore patented by me for a similar purpose, which I have found to produce evil results, I have added others, with the light of experience, both in the aforesaid mixture, called "bony," and in the following compound for application, viz:

I put into an earthen jar, eight ounces of quicksilver. To this I add four ounces of nitric acid, stirring the same until the quicksilver is thoroughly cut by the acid, and has the appearance of a milky liquid. I then add one ounce of resublimate of iodine, stirring rapidly for one minute. I then add half an ounce of bichloride of mercury, stirring rapidly half a minute. I then add one-fourth of an ounce of pulverized camphor-gum, stirring rapidly for half a minute. I then add four drachms pulverized cantharides, stirring half a minute. Then add four ounces sulphuric acid, turning it in slowly, and stirring for one minute. I then add one and a half ounce of prepared chalk, stirring one-fourth of a minute. I then add half an ounce of the above mixture, called "bony," turning in one-fourth at a time, stirring well. I then turn in, slowly, half an ounce of balsam-copaiva and half an ounce of glycerine, mixed and well shaken together, slowly and constantly stirring for three minutes; then partly cover the mixture and let it stand twenty minutes, and it is ready for use. This mixture I have denominated my "Ring-Bone and Spavin-Annihilator."

The medicine is applied to the parts affected by first removing the hair, and then thoroughly wetting the surface with the "bony," and letting it dry. Then rub well in the annihilator, by means of a swab or sponge, or other means, leaving a covering of this salve, of the thickness of a penny. This application should be repeated, morning and evening, until the callous is gone.

Each time of making the application, the former covering should be well brushed off, and the surface cleaned, then wet with the "bony," and again dried as before.

After the callous is removed, and for the purpose of healing, and preventing any resulting soreness of the limb, and to remove all inflammation that may arise from the use of the above applications, I use a compound wash, made as follows:

Mix four ounces of glycerine, forty grains iodide of potassa, sixty grains resublimate of iodine, one ounce balsam-copaiva, one ounce of tincture of blood-root, one ounce of tincture of myrrh, (the copaiva, blood-root, and myrrh first mixed separately, and then all mixed together,) and let stand twenty-four hours.

Then apply this wash daily, well rubbed in, until all soreness is removed.

This mixture I denominate "Cleveland's Healing-Oil."

Having thus described my medicine, and the manner of compounding and using the same,

What I claim as my invention, and desire to secure by Letters Patent, is—

The medical compounds above described, to be compounded and prepared substantially as above described, and for the purposes described.

WM. A. CLEVELAND.

Witnesses:
WILLIAM BAKER,
CHARLES BARNUM.